US012596825B2

(12) United States Patent
Andrews

(10) Patent No.: US 12,596,825 B2
(45) Date of Patent: Apr. 7, 2026

(54) ENVIRONMENT DETECTION AND OPTIMIZATION FOR AN INFORMATION HANDLING SYSTEM

(71) Applicant: Dell Products L.P., Round Rock, TX (US)

(72) Inventor: Maxwell S. Andrews, Kennett Square, PA (US)

(73) Assignee: Dell Products L.P., Round Rock, TX (US)

( * ) Notice: Subject to any disclaimer, the term of this patent is extended or adjusted under 35 U.S.C. 154(b) by 167 days.

(21) Appl. No.: 18/423,601

(22) Filed: Jan. 26, 2024

(65) Prior Publication Data

US 2025/0245363 A1 Jul. 31, 2025

(51) Int. Cl.
G06F 21/62 (2013.01)
G06F 40/20 (2020.01)
G06N 5/04 (2023.01)

(52) U.S. Cl.
CPC ........... G06F 21/6218 (2013.01); G06N 5/04 (2013.01); G06F 40/20 (2020.01)

(58) Field of Classification Search
CPC ........................ G06F 21/62–6227; G06N 5/04
See application file for complete search history.

(56) References Cited

U.S. PATENT DOCUMENTS

| | | | |
|---|---|---|---|
| 2009/0276155 A1* | 11/2009 | Jeerage | G01S 19/20 |
| | | | 701/472 |
| 2016/0246987 A1* | 8/2016 | Gillon | G06F 21/6218 |
| 2022/0171875 A1* | 6/2022 | Jasleen | G06F 21/6245 |
| 2022/0358232 A1* | 11/2022 | Yuan | G06F 21/629 |
| 2025/0117516 A1* | 4/2025 | Hunsberger | G06T 7/90 |
| 2025/0165649 A1* | 5/2025 | Bongiovanni | G06F 21/602 |

* cited by examiner

*Primary Examiner* — Jonathan A Bui
(74) *Attorney, Agent, or Firm* — Norton Rose Fulbright US LLP

(57) ABSTRACT

According to aspects of this disclosure, information handling systems may be used to manage and control access to confidential or sensitive information, such as employer-owned information that may be accessed by a user via one or more devices of the user. Embodiments of this disclosure may be used to implement a content-based information protection scheme that provides secure access control to information managed by an information handling system using sensor-based inferences of a user's environment and behavior within the environment. For example, the user may request remote access to a document including sensitive information via a user interface of a first device operated by the user within an environment (e.g., an airport, coffee shop, or other public place).

18 Claims, 7 Drawing Sheets

600

602 — Receive, by an information handling system, data from one or more sensors of a first device operated by a user within an environment 604 — Determine a behavior pattern of the user within the environment based on the data 606 — Compare the behavior pattern of the user with a behavior policy that controls access to information corresponding to each of one or more content areas of a document requested by the user within the environment 608 — Provide, via a user interface of the first device, a secure view of the document with content displayed for the information corresponding to each of the one or more content areas of the document, based on the comparison

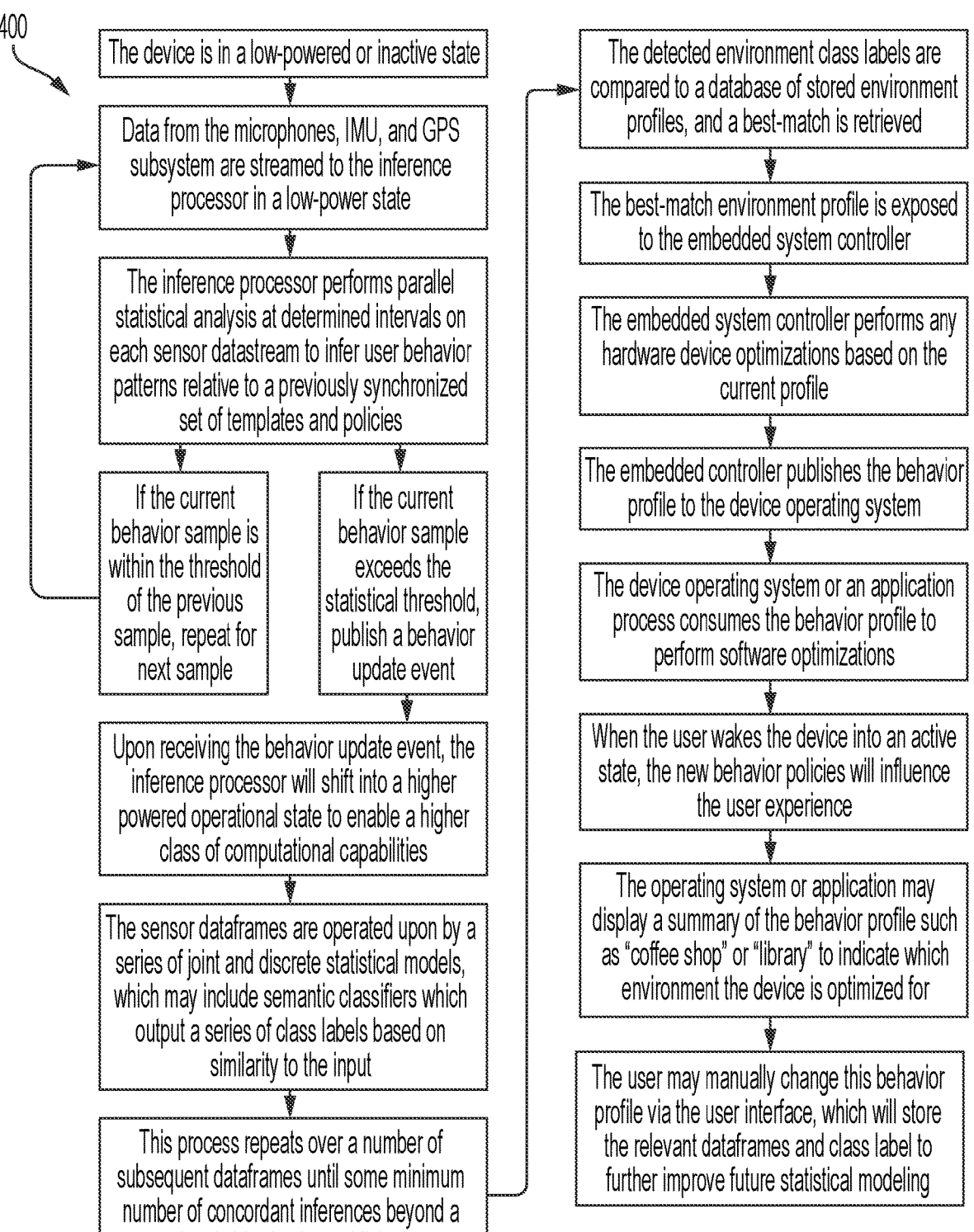

400

The device is in a low-powered or inactive state

Data from the microphones, IMU, and GPS subsystem are streamed to the inference processor in a low-power state The inference processor performs parallel statistical analysis at determined intervals on each sensor datastream to infer user behavior patterns relative to a previously synchronized set of templates and policies If the current behavior sample is within the threshold of the previous sample, repeat for next sample If the current behavior sample exceeds the statistical threshold, publish a behavior update event Upon receiving the behavior update event, the inference processor will shift into a higher powered operational state to enable a higher class of computational capabilities The sensor dataframes are operated upon by a series of joint and discrete statistical models, which may include semantic classifiers which output a series of class labels based on similarity to the input This process repeats over a number of subsequent dataframes until some minimum number of concordant inferences beyond a threshold value is established The detected environment class labels are compared to a database of stored environment profiles, and a best-match is retrieved The best-match environment profile is exposed to the embedded system controller The embedded system controller performs any hardware device optimizations based on the current profile The embedded controller publishes the behavior profile to the device operating system The device operating system or an application process consumes the behavior profile to perform software optimizations When the user wakes the device into an active state, the new behavior policies will influence the user experience The operating system or application may display a summary of the behavior profile such as "coffee shop" or "library" to indicate which environment the device is optimized for The user may manually change this behavior profile via the user interface, which will store the relevant dataframes and class label to further improve future statistical modeling

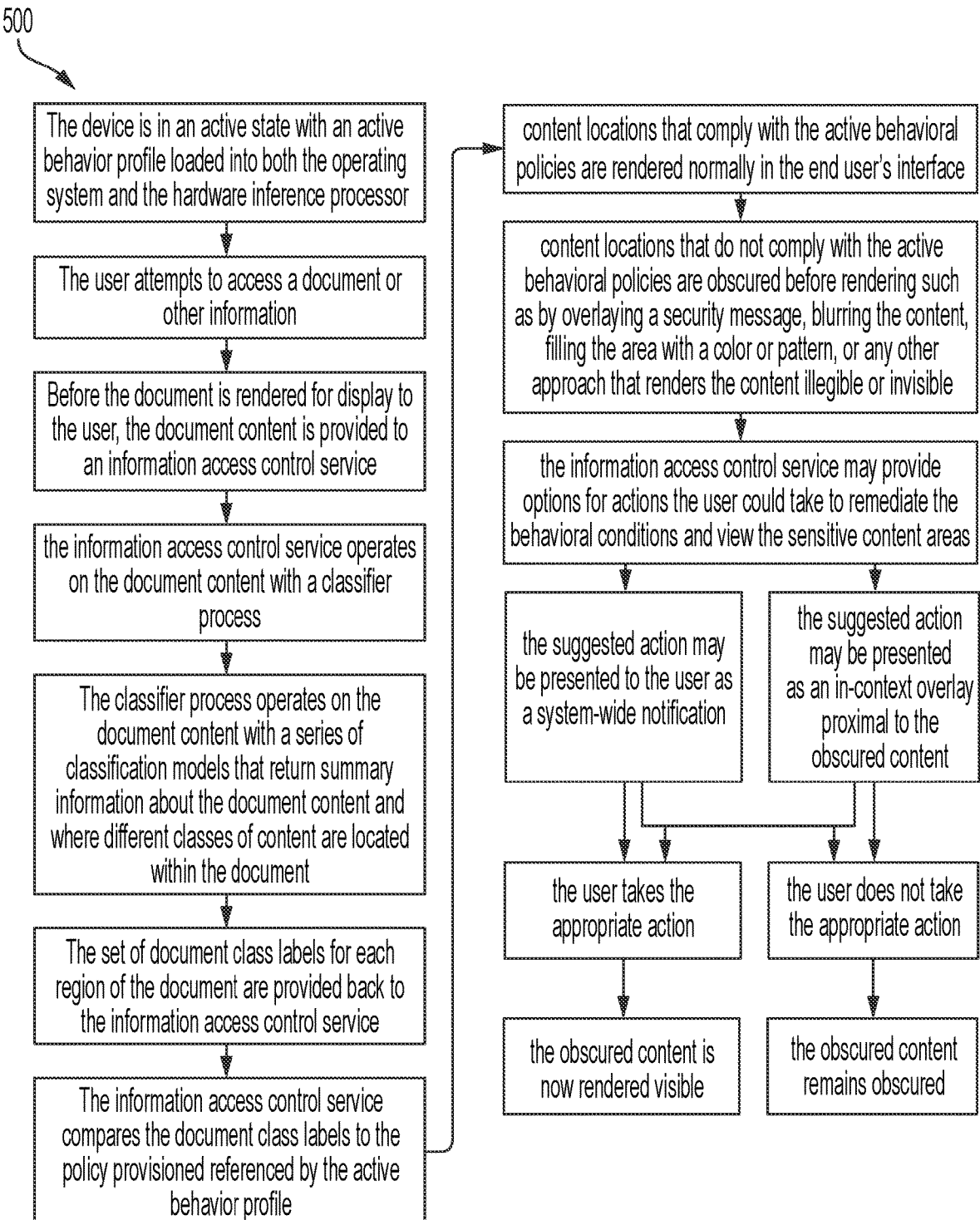

The device is in an active state with an active behavior profile loaded into both the operating system and the hardware inference processor The user attempts to access a document or other information Before the document is rendered for display to the user, the document content is provided to an information access control service the information access control service operates on the document content with a classifier process The classifier process operates on the document content with a series of classification models that return summary information about the document content and where different classes of content are located within the document The set of document class labels for each region of the document are provided back to the information access control service The information access control service compares the document class labels to the policy provisioned referenced by the active behavior profile content locations that comply with the active behavioral policies are rendered normally in the end user's interface content locations that do not comply with the active behavioral policies are obscured before rendering such as by overlaying a security message, blurring the content, filling the area with a color or pattern, or any other approach that renders the content illegible or invisible the information access control service may provide options for actions the user could take to remediate the behavioral conditions and view the sensitive content areas the suggested action may be presented to the user as a system-wide notification the suggested action may be presented as an in-context overlay proximal to the obscured content the user takes the appropriate action the user does not take the appropriate action the obscured content is now rendered visible the obscured content remains obscured

FIGURE 5

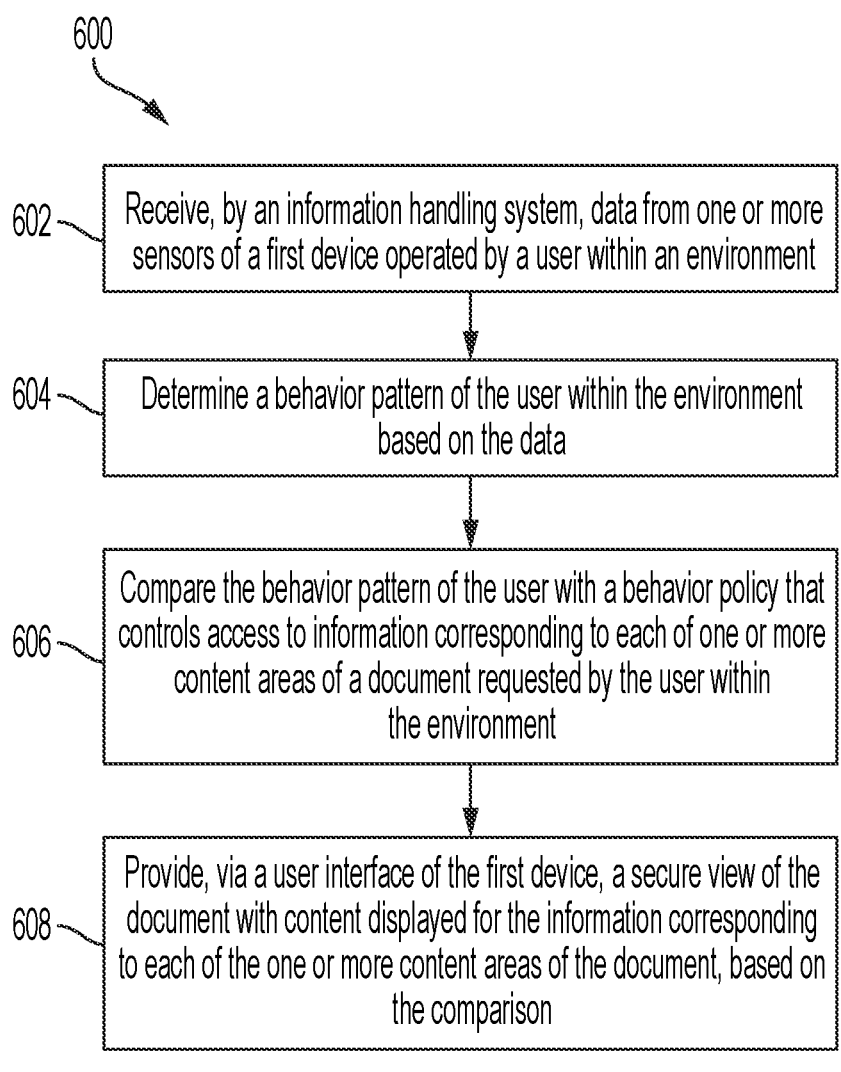

600

602 — Receive, by an information handling system, data from one or more sensors of a first device operated by a user within an environment 604 — Determine a behavior pattern of the user within the environment based on the data 606 — Compare the behavior pattern of the user with a behavior policy that controls access to information corresponding to each of one or more content areas of a document requested by the user within the environment 608 — Provide, via a user interface of the first device, a secure view of the document with content displayed for the information corresponding to each of the one or more content areas of the document, based on the comparison

FIGURE 6

ENVIRONMENT DETECTION AND OPTIMIZATION FOR AN INFORMATION HANDLING SYSTEM

FIELD OF THE DISCLOSURE

The instant disclosure relates to information handling systems. More specifically, portions of this disclosure relate to an information handling system for providing secure information access control using sensor-based inferences of a user's environment and behavior within the environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Users may utilize their digital devices in a diverse range of environments and situations to access the information managed by an information handling system. For remotely managed devices used to access confidential or sensitive information, such as employer-provided personal computers and mobile phones or similar employee-owned devices used to access employer-owned information, it is advantageous for the managing organization to implement accurate information protection features that balance security policies with end user experience according to the specific situation of the end user. However, the interaction behaviors and security controls programmed into each device cannot be statically optimized for every eventuality, and few behaviors persist across all user devices. This often leads to users needing to frequently adjust device settings and routines manually across multiple devices and peripherals as they move between different environments, which can become very tedious and negatively impact user experience.

SUMMARY

Information handling systems may be used to manage and control access to confidential or sensitive information, such as employer-owned information that may be accessed by a user via one or more devices of the user. Embodiments of this disclosure may be used to implement a content-based information protection scheme that provides secure access control to information managed by an information handling system using sensor-based inferences of a user's environment and behavior within the environment. For example, the user may request remote access to a document including sensitive information via a user interface of a first device operated by the user within an environment (e.g., an airport, coffee shop, or other public place). The first device may be, for example, an employer-provided laptop or personal mobile device associated with the user and remotely managed by the employer. The document may include, for example, sensitive company information associated with a workplace application executable at the first device. The information handling system in this example may control access to the sensitive information within the requested document based on telemetry data received from one or more sensors of the first device. Examples of such sensors include, but are not limited to, one or more location sensors or devices (e.g., a global positioning system (GPS) for measuring geographical location or an antenna for measuring relative location using signal propagation across one or more frequency bands), one or more motion sensors (e.g., a gyroscope, an accelerometer, a magnetometer, an inertial measurement unit (IMU), etc.), a microphone for capturing audio or measuring noise levels, and a fingerprint sensor for user identification.

In some implementations, the information handling system may analyze the sensor data using one or more models (e.g., statistical models, machine learning models, etc.) to infer attributes of the environment and a behavior pattern of the user within the environment. The inferences regarding the environment and user behavior may then be used to control which information and/or portions of the requested document can be accessed or viewed by the user. For example, the document may include different classes of content having different access privileges and requirements for the user to access or view the content in one or more content areas of the document. In some implementations, each content area of the document may be associated with a behavior policy with which the behavior pattern of the user must comply to view the corresponding content. The behavior policy may be specified by an environment profile determined for the environment. The environment profile may be one of a plurality of environment profiles stored in a database, which has been identified as having known attributes that match the inferred attributes of the current environment of the user and user device. The behavior policy associated with each content area of the document may be compared with the inferred behavior pattern to determine whether the user's behavior complies with the policy. Based on this comparison, a secure view of the document with appropriate content displayed for the information corresponding to each content area may be provided via a user interface of the device. For example, the content displayed for any content area of the document for which the user's behavior does not comply with the associated behavior policy may obscure the information corresponding to that area of the document.

Accordingly, aspects of this disclosure may be used to support the execution of a content-based information protection scheme for an information handling system that uses sensor-based inferences of a user's environment and behavior to provide secure access to information requested by the user. Such information may be requested by the user via an interface of an employer-managed device during one or more application sessions initiated by the user for an application (e.g., a workplace application) across different environments. The use of sensor-based inferences allows the disclosed protection scheme to provide in-context correction of end-user behavior and advanced behavior modeling to enable the employer or managing organization to better equip its end users for working securely in a hybrid environment.

Conventional solutions for information access control generally fail to account for the specific content of the information requested by the end user, which can lead to false positives and intrusive interruptions that limit the user's ability to access certain content that the user should be able to freely access without violating any security policies or posing any security risks. Unlike such conventional solutions, the disclosed techniques leverage multimodal, multi-domain inference aggregations at the endpoint to control user access to sensitive information in a way that balances security policies with end user experience. Furthermore, inferences about a device's operating environment gleaned from embedded sensors may be used to optimize device behaviors in various ways to further enhance end user experience.

Shortcomings mentioned here are only representative and are included to highlight problems that the inventors have identified with respect to existing information handling systems and sought to improve upon. Aspects of the information handling systems described below may address some or all of the shortcomings as well as others known in the art. Aspects of the improved information handling systems described below may present other benefits than, and be used in other applications than, those described above.

According to one embodiment, a method may include receiving, by an information handling system, data from one or more sensors of a first device operated by a user within an environment; determining a behavior pattern of the user based on the data that identifies the environment; determining a behavior policy based on the behavior pattern, wherein the behavior policy controls access to information corresponding to at least one or more content areas of a document requested by the user while in the environment; and providing, via a user interface of the first device and based on the behavior policy, a secure view of the document with content displayed for the information corresponding to the at least one or more content areas of the document.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, audio controller, or similar electronic computing device that manipulates and transforms data represented as physical (electronic) quantities within the computer system's registers and memories into other data similarly represented as physical quantities within the computer system's registers, memories, or other such information storage, transmission, or display devices.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 4 is a flow diagram of an example method for determining sensor-based inferences of a user's environment according to some embodiments of the present disclosure.

FIG. 5 is a flow diagram of an example method for applying sensor-based inferences of a user's behavior within an environment to provide content-based information access control according to some embodiments of the present disclosure.

FIG. 6 is a flow diagram of an example method for providing secure information access control using sensor-based inferences of a user's environment and behavior within the environment according to some embodiments of the present disclosure.

DETAILED DESCRIPTION

Figure 1:
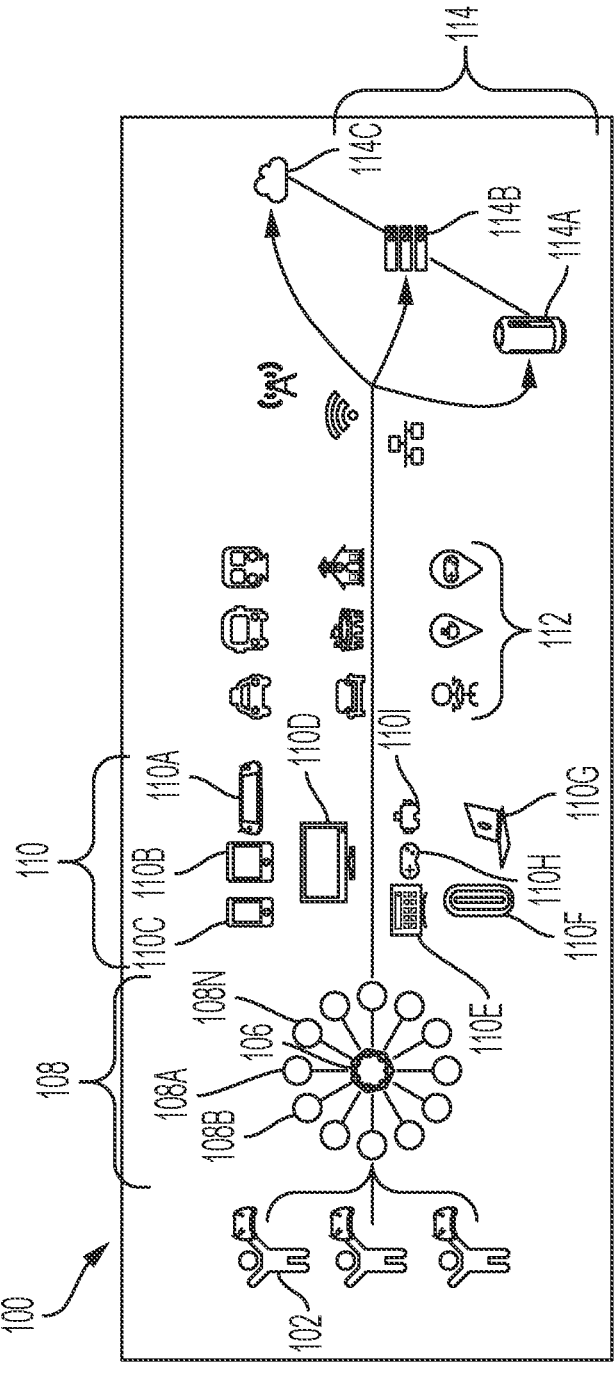
FIG. 1 is a block diagram illustrating aspects of a configurable system for providing various services to users according to some embodiments of the present disclosure.

Embodiments of the present disclosure may be used to provide an information handling system with a content-based information protection scheme that applies sensor-based inferences of a user's environment and behavior patterns to control access to sensitive information requested by the user via a first device operated by the user within the environment. In some embodiments, the inferences may be based on data received by the information handling system (or information access control service thereof) from one or more sensors of the first device. Examples of such sensors include, but are not limited to, one or more location sensors or devices (e.g., a global positioning system (GPS) for measuring geographical location or an antenna for measuring relative location using signal propagation across one or more frequency bands), one or more motion sensors (e.g., a gyroscope, an accelerometer, a magnetometer, an inertial measurement unit (IMU), etc.), a microphone for capturing audio or measuring noise levels, and a fingerprint sensor for user identification.

As will be described in further detail below, the sensor-based inferences about the user's environment and behavior may be used to provide secure access to information requested by the user via a user interface of the first device. In some implementations, such inferences also may be used to adjust a configuration or relevant settings of the first device to provide a secure view of the requested information that balances secure access control policies with end user experience. Additionally, one or more workflow automations may be executed on behalf of the user. The workflow automations may not only affect configuration settings and user-interaction behaviors of the first device but also affect the settings and behaviors of other electronic devices associated with the user in proximity to and/or connected to the first device via a wired or wireless connection. For example, the user may be provided with an option to view the requested information via a more secure interface of a second device (e.g., a head-mounted display device) connected to the first device (e.g., a mobile phone, laptop computer, or tablet device). Such automations may also be influenced by user preferences and/or information management policies (e.g., as established by an employer or other entity that owns and/or manages the information).

The term "environment" in this context may refer to any public or private third-party environment at a location that is remote and external to (or unaffiliated with) the original source of the information (e.g., a private employer or other entity who owns the information) being accessed or requested by a user via a device operated by the user within the environment. Accordingly, the user's environment may be synonymous with the operating environment of the device. Examples of such environments include, but are not limited to, a coffee shop, a restaurant, public transport stations/terminals, and public transport vehicles (e.g., airport terminals and airplanes, train stations and trains, bus stations and buses, etc.). A user in such an environment may request access to different types of information, including sensitive information, via a device operated by the user.

The mobility of a user between environments during an application session may be supported by an information handling system that uses available telemetry from multiple sources to build a confidence-based knowledge graph of the environments and determine a position of the user within that graph. A system with knowledge of devices associated with the user in each environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is located near a device. An intelligent system may assemble these individual pieces of telemetry into a broader knowledge graph based on the absolute and/or relative locations of the user's devices, the location of the user in relation to each device, and/or characteristics of the devices. This knowledge graph may be updated in real time and/or based on changes in device telemetry.

Aspects of the disclosed embodiments may be used to provide an information access control scheme for an information handling system, such as a server or client device, which uses sensor-based inferences of a user's environment and actions or behaviors within the environment to control the user's access to confidential information. In some embodiments, the aspects described herein may be used to support the execution of the content-based information protection scheme for the information handling system during one or more application sessions initiated by the user (e.g., for the workplace application) across different environments. The information protection scheme may execute as an information access control service of the information handling system, either locally on a device, on another system on the network, or in the cloud for each application session. A user of the device may request access to the information during an application session for a corresponding application executable at the device. The application may communicate with the service to receive and transmit content requests from the user to the service and provide the user with secure access to the requested information via the service. A user interface of the device or the application executing thereon may be used to provide a secure view of the requested information. Different environments may be associated with a different set of user devices, and the devices may be automatically paired with one another and configured to support interaction with the user during an application session based on the content provided by the service. These example embodiments describe and illustrate various configurations of an information handling system for implementing the secure information access control techniques disclosed herein.

Inferences about a device's operating environment gleaned from sensor data may also be used to optimize device behaviors in various ways. For example, a user may be attempting to access sensitive company information on their laptop computer while in a public space, such as an airport. Through analysis of information from multiple device sensors, the information handling system may determine that the likely location of the user is a busy airport terminal. The system in this example may assign a probability score to several categories, such as risk of data exposure, the user's seating position, and likely use vectors. These probabilities may be correlated with user or organizational policies to determine a set of workflow automations and behavior optimizations. Such a workflow automation may involve, for example, prompting the user to don a head-mounted display (HMD) to privately view company information in the current environment. The transfer of the sensitive information to this second device, once donned by the user, may be assisted using other workflow automations. The user may also be given the option of viewing the information on a laptop display with significant redactions. Additionally, when the user stands up to begin the boarding process, the HMD may be updated with the user's seat assignment and boarding zone, and the user's boarding QR code may be automatically surfaced on the user's mobile phone for easy presentation.

In another example, a user may be seated on an airplane while viewing media content on a head-worn display device, via a wireless connection to a mobile phone. The head-worn device may include sensors and a sensor processing unit that predicts with high likelihood that the user is currently seated on an airplane. This knowledge may be used to implement a specific set of interaction behaviors that are advantageous to this scenario. For example, when the user stands up, such as to use the restroom, a signal may be sent to the mobile phone to pause the media content. The content may also be hidden from the HMD to allow the user better visibility to navigate the plane aisle without needing to remove the HMD or manually change settings.

In yet another example, a user may be seated on public transportation while interacting with their mobile phone. The user may choose to watch a video with accompanying audio content on the mobile phone. The acoustic signature of the device inferred from audio data received from a microphone of the device may inform the information handling system with high probability that the user is on public transit with other individuals present. Based on the user's location (e.g., as derived from the device's location sensor data), the information handling system in this example may suggest the user wear headphones to avoid disturbing other passengers and better align with the cultural norms of the current locality. Additionally, data from ambient light sensors embedded in the mobile device may be used to automatically control display brightness to conserve battery life while camera-based inferences may be used to detect "over the shoulder" eavesdropping.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. One example of an information handling system will be described below with reference to FIG. 7.

FIG. 1 is a block diagram illustrating aspects of a configurable system 100 for providing various services to users according some embodiments of the disclosure. The services provided by the system 100 may include, for example, an information access control service for users 102 of an information handling system 114. In some embodiments, the information handling system 114 may provide the users 102 with access to the services via a shared library 106 of applications 108, including applications 108A-108N. In some implementations, the library 106 may include separate libraries for the users 102, with some overlapping applications between the libraries. The users 102 may access the applications 108 and associated services through devices 110. The devices 110 may include, for example and without limitation, a mobile gaming device 110A, a tablet computing device 110B, a phone computing device (or smartphone) 110C, a television 110D, a personal computing device 110E, a desktop computing device 110F, a laptop computing device 110G, a game controller 110H, and a headset device (e.g., a virtual reality (VR) headset or other head-mounted display (HMD)) 110I. Each of the users 102 may use one or more of the devices 110 to access the applications 108 and services of the information handling system 114 from any of various locations or environments 112, including cars, busses, homes, hotels, offices, parks, or other public places. For example, a device, such as one of the devices 110, operated by a user within such an environment may communicate with the information handling system 114 via a network, such as a wired network, a wireless network (e.g., a cellular network), or a combination thereof. The information handling system 114 may be implemented using any computing device or system, such as a home application hub 114A, a server 114B, or a cloud computing system 114C.

In some implementations, the user in the above example may initiate an application session for one of the applications 108, such as a workplace application, which may execute as a service either locally on the user's device or at another system (e.g., the information handling system 114) communicatively coupled to the user's device via the network. The device, or the application executing at the device, may include a user interface that receives and transmits input from the user to the service and provides feedback to the user from the service. For example, the user interface may include various user interface controls that allow the user to request access to information managed by the information handling system 114 during the application session. The device may include its own audio/visual (AV) output, such as a display, for displaying or rendering at least a portion of the requested information via the user interface during the application session. Some of the environments 112 may include one or more secondary devices associated with the user that can be used to display the requested information in place of or in addition to the first device during the application session. Such secondary devices may include, for example, one or more peripheral devices (e.g., a head-mounted display), which may be paired with the user's first device and configured to support interaction with the application session via the paired device. In some implementations, the user may move between the different environments 112 and continue the application session using either the same or different device(s).

As will be described in further detail below, the information handling system 114 (or information access control service thereof) may be used to control access to any sensitive information requested by the user while operating each device within an environment. Sensitive information may include, for example, any confidential or private information to which access is restricted or controlled (e.g., according to security policies established by an employer or other entity that owns the information).

Figure 2:
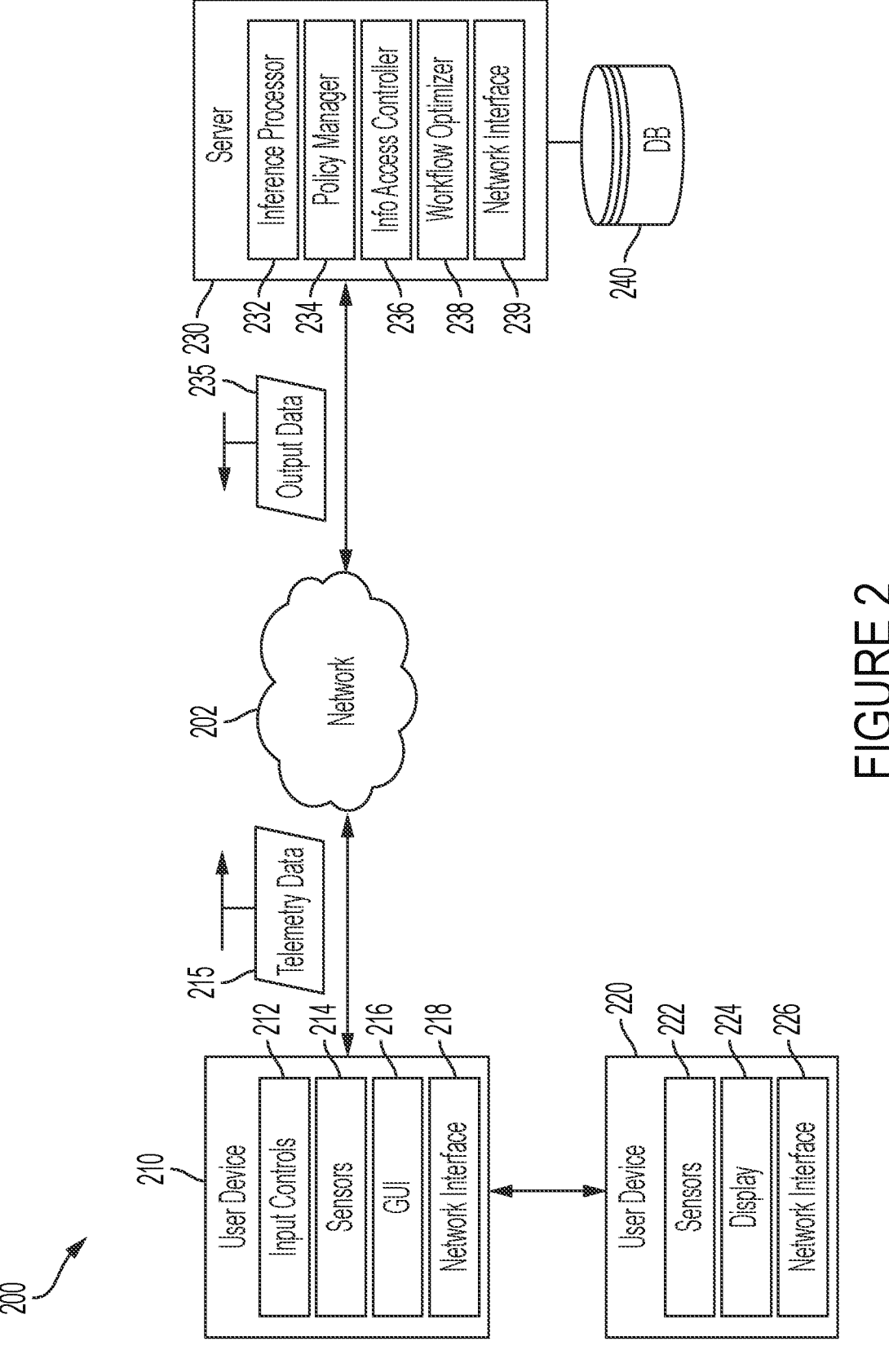
FIG. 2 is a block diagram of an example configuration of a distributed system for providing secure information access control using sensor-based inferences of a user's environment and behavior within the environment according to some embodiments of the present disclosure.

FIG. 2 is a block diagram of an example configuration of a distributed system 200 for providing secure information access control using sensor-based inferences of a user's environment and behavior within the environment according to some embodiments of the present disclosure. System 200 may include or correspond to one or more devices in the system 100 of FIG. 1, as described above.

As shown in FIG. 2, the system 200 includes a user device 210, a user device 220, a server 230, and a database (DB) 240. Each of the user devices 210 and 220 may be communicatively coupled to the server 230 via a network 202. In some implementations, the user device 220 may be indirectly coupled to the network 202 and the server 230 via a wired or wireless connection to the user device 210, as will be described in further detail below. The network 202 may include a wired network, a wireless network, or a combination thereof. To illustrate, the network 202 may include a Bluetooth personal area network (PAN), a local area network (LAN), a wireless LAN (WLAN), a wide area network (WAN), a wireless network (e.g., a cellular network), a wired network, the Internet, one or more other networks, or a combination thereof, as illustrative, non-limiting examples. In some implementations, the network 202 may include or correspond to a wired or wireless connection between the server 230 and each of the user devices 210 and 220.

In some embodiments, the server 230 may include or correspond to an information handling system including one or more computing devices for executing various applications and services. For example, the server 230 may operate as an application server that provides a cloud-based execution environment for an application, such as a workplace application associated with an employer. The user devices 210 and 220 in this example may be employer-managed devices that enable a user, such as an employee, to execute the application or access features thereof via a user interface of the respective user devices 210 and 220. The user interface may correspond to, for example, a graphical user interface (GUI) associated with an instance of the application executable at each of the user devices 210 and 220. In some implementations, the server 230 may be used to host an information access control service for controlling user access to sensitive and confidential information managed by the information handling system, e.g., during an application session initiated by the user via a corresponding user interface, as described above. The sensitive information managed by the server 230 (or access control service thereof) may be stored in the DB 240. The DB 240 may be, for example, a local database or data storage medium coupled to the server 230 via a wired or wireless connection. Alternatively, the DB 240 may be a remote database, such as a cloud data repository or service hosted by another information handling system or a cloud computing resource, accessible to the server 230 via the network 202.

The server 230 may include, for example, an inference processor 232, a policy manager 234, an information access controller 236, a workflow optimizer 238, and a network interface 239. In some embodiments, the inference processor 232, the policy manager 234, the information access controller 236, and the workflow optimizer 238 may work together to perform various operations of the information access control service. As will be described in further detail below, such operations may be performed as part of an automated service that monitors behavior patterns of the user based on data received from sensors of a device (e.g., user device 210) operated by the user across one or more environments and dynamically updates interaction behaviors of the device to provide secure information access control according to the user's behavior and/or attributes of the current environment. Such a device interaction behavior may be updated by, for example, adjusting a configuration or setting of the device or user interface thereof, which affects the user experience or interaction between the user and the device.

In some embodiments, the user devices 210 and 220 may be different types of computing devices, such as the devices 110 of FIG. 1, associated with the user. For example, the user device 210 may be a first type of device, such as a mobile device (e.g., the tablet computing device 110B, the phone computing device 110C, or the laptop computing device 110G of FIG. 1) operated by the user within an environment, such as an airport, coffee shop, or other public place (e.g., one of the environments 112 of FIG. 1). The user device 220 may be a second type of device, such as a peripheral device (e.g., the headset or HMD device 110I of FIG. 1), which may be communicatively coupled or paired to the user device 410 via a wired or wireless connection. In other implementations, however, the user devices 210 and 220 may be similar types of computing devices that can independently communicate with server 230 via the network 202. Also, while only the user device 210 is shown in FIG. 2 as being communicatively coupled to the server 230 via the network 202, it should be appreciated that embodiments are not intended to be limited thereto and that each of the user devices 210 and 220 may be configured to communicate with the server 230 via the network 202.

Each of the user devices 210 and 220 may include a processor or other computing circuitry (e.g., a microcontroller, one or more application specific integrated circuits (ASICs), or the like) and various interfaces for input, output, and network communications with other devices (including the server 230). Each of the user devices 210 and 220 may also include a memory. The memory may include or correspond to a read only memory (ROM) device, a random access memory (RAM) device, one or more hard disk drives (HDDs), a flash memory device, a solid state drives (SSDs), or any other device or combination of different devices configured to store data in a persistent or non-persistent state. In some implementations, the memory may be used to store one or more instructions, including instructions executable by the processor for a software application. Additionally or alternatively, the memory may be used to store one or more thresholds, data, user preferences, one or more device configurations, parameters, other device settings, or any combination of the foregoing.

In some embodiments, each of the user devices 210 and 220 may be configured to receive user input via a user interface (such as from user operation of a button or other input device) and to transmit signals to the server 230 via the network 202 based on the user input. Each of the user devices 210 and 220 may also be configured to receive information (e.g., instructions or data or both) from the server 230 via the network 202 (e.g., in response to the transmitted signals) and to generate an output (such as one or more of an audio output, a visual output, a haptic output, or another output) based on the received information. Accordingly, the user devices 210 and 220 may include respective network interfaces 218 and 226 for communicating with the server 230 (or the network interface 239 thereof) via the network 202. Each of the network interfaces 218, 226, and 239 may include one or more communication interfaces, such as a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or any combination thereof.

In some embodiments, the user device 210 may further include one or more input controls 212, one or more sensors 214, and a GUI 216. In some implementations, the input controls 212, the sensors 214, and the GUI 216 may correspond to different input/output (I/O) interfaces of the user device 210. Such I/O interfaces may include, for example, one or more input interfaces for receiving user input based on the user's physical interaction with the one or more input controls 212 and/or the GUI 216 (e.g., via a capacitive touchscreen display of the user device 210). The input controls 212 may include, for example, one or more depressible buttons, triggers, thumbsticks, scroll wheels, directional pads, touchscreens or touchpads, and other types of input controls that may be coupled to or integrated within the user device 210. The user input or corresponding input data generated by the input controls 212 may include, for example, the user's button selections or other input entered by the user using the input controls 212 and/or the GUI 216.

Likewise, user device 220 may further include one or more sensors 222 and a display 224. Although not shown in FIG. 2, the user device 220 may also include input and output controls along with corresponding I/O interfaces similar to the user device 210. In some implementations, the input controls of the user device 220 may be provided via the display 224 as software input controls of a GUI similar to the GUI 216 of the user device 210. Additionally or alternatively, input received via the input controls 212 of the user device 210 may be transferred to the user device 220 or used to control operations of the user device 220.

The sensors 214 and 222 of the respective user devices 210 and 220 may include any of various sensing or measurement devices for collecting different types of measurements or data relating to one or more of the user, the respective user devices 210 and 220, and a current operating environment of each device. Such sensors may be coupled to or integrated with each of the user devices 210 and 220. Examples of such sensors include, but are not limited to, one or more location sensors or devices (e.g., a global positioning system (GPS) for measuring geographical location or an antenna for measuring relative location using signal propagation across one or more frequency bands), one or more motion sensors (e.g., a gyroscope, an accelerometer, a magnetometer, an inertial measurement unit (IMU), etc.), a microphone for capturing audio or measuring noise levels, and a fingerprint sensor for user identification. The data collected by one or more of the sensors 214 of the user device 210 and/or the sensors 222 of the user device 220 may be transmitted or streamed to the server 230 (or the network interface 239 thereof) as telemetry data 215 via the network 202.

The server 230 may be a computing device or system (e.g., the information handling system 114 of FIG. 1) having a memory and one or more processors, such as a CPU or other computing circuitry (e.g., a microcontroller, one or more ASICs, or the like), in addition to the network interface 239. The processor(s), memory, the network interface 239, and other components of the server 230 may be coupled to each other via a data bus. The memory of the server 230 may include a read only memory (ROM) device, a random access memory (RAM) device, one or more hard disk drives (HDDs), a flash memory device, a solid state drives (SSDs), another devices configured to store data in a persistent or non-persistent state, or a combination of different memory devices. The memory may be a computer-readable medium used to store one or more instructions, such as instructions or code for the information access control service. To illustrate, the memory may store instructions that, when executed by the processor(s) of the server 230, cause the processor(s) to perform operations relating to the information access control techniques disclosed herein. Additionally, the memory may be used to store one or more thresholds, data, preferences, other settings, or any combination thereof. In some embodiments, the memory may also be used to store one or more models, such as statistical models and/or machine learning (ML) models, for performing various types of data analysis on the telemetry data 215 received from the user device 210 and/or user device 220, as will be described in further detail below.

In some embodiments, the telemetry data 215 received by the server 230 (e.g., from the sensors 214 of the user device 210) may be processed and analyzed by the inference processor 232, e.g., as part of the information access control service provided by the server 230, to infer attributes of the current operating environment of the user device 210 (and/or user device 220) as well as the user's behavior pattern within the environment. For example, the telemetry data 215 may be streamed from each of the sensors 214 of the user device 210 to the inference processor 232 of the server 230 via the network 202 as the user device 210 (and user) move across different environments. The inference processor 232 in this example may perform statistical analysis on each sensor data stream in parallel, e.g., at the time the data is received or at periodic intervals, to infer the environment attributes and user behavior patterns (or detect any changes therein) over a period of time. As will be described in further detail below, such inferences may be used by other components of the server 230 (including the policy manager 234, the information access controller 236, and the workflow optimizer 238) to perform additional data analyses and other operations associated with the information access control service for controlling access to confidential or sensitive information requested by the user via a user interface (e.g., GUI 216) of the user device 210. For example, the inferred environment attributes and user behavior pattern may be used to provide appropriate output data 235 to the user device 210 via the network 202 in response to the user's request for information.

In some embodiments, the type of the output data 235 may be dependent upon one or more behavior policies associated with the requested information. For example, the requested information may correspond to one or more content areas of a document requested by the user via the GUI 216 of the user device 210. Each of the content areas in this example may be associated with a behavior policy that dictates what types of behaviors or user actions are deemed acceptable for the user to access or view sensitive information while operating the user device 210 within a particular environment. In some embodiments, the policy manager 234 may analyze the inferred attributes of the environment to determine a corresponding environment profile that specifies the behavioral conditions or policies associated with the content area(s) of the requested document. The environment profile may be one of a plurality of environment profiles stored in the DB 240 for different types of environments for which the attributes are known and the behavior policies defined or established (e.g., by an entity, such as an employer, that owns or manages access to the document and/or the information corresponding to each content area thereof). In some embodiments, the policy manager 234 may determine the appropriate environment profile for the current operating environment by first comparing the inferred attributes of the environment with known attributes associated with each environment profile stored in the DB 240 and then, identifying the stored environment profile for which the known attributes match the inferred attributes based on the comparison.

In some embodiments, each environment profile stored in the DB 240 may represent a different environment in which the user (or other registered user of the information access control service hosted by the server 230) has operated a corresponding user device for which the service manages information access. The environment profile and known attributes for each environment may be based on historical data, such as previous sensor-based inferences and/or information derived from other data sources associated with that environment. In some implementations, the historical information for each environment profile stored within the DB 240 may be linked to a user profile or account registered to each user. The user profile or account for each user may be stored in the DB 240 or another database (not shown) accessible to the server 230. The user profile may include, for example, the user's age, gender, and other relevant data about the user. Additionally, the user's profile may include device metadata, which identifies one or more devices associated with the user (e.g., the user devices 210 and 220) and one or more operating environments for each device. The device metadata may include, for example and without limitation, a unique device identifier, a device type, a device manufacturer, a device model, a device location or location history (e.g., corresponding to each environment in which the device was located or operated by the user), or any combination thereof. In some implementations, the user profile information may include inference data relating to previous samples of the user's behavior pattern based on prior sensor-based inferences of the user's behavior within one or more environments.

In some embodiments, the information access controller 236 may compare the inferred behavior pattern of the user in the above example with the appropriate behavior policy of the corresponding environment profile to control access to the information for each content area of the document requested by the user. For example, the information access controller 236 may determine whether the behavior pattern of the user complies with the behavior policy specified by the environment profile for each content area of the document. Based on this determination, the information access controller 236 may generate and transmit the output data 235 with appropriate content for each content area of the document to be displayed via the GUI 216 of the user device 210. In some implementations, the information access controller 236 may provide a secure view of the document with the appropriate content displayed for the information corresponding to each content area of the document via the GUI 216 of the user device 210. If the behavior pattern of the user complies with the behavior policy associated with a first content area of the document, for example, the content displayed for the first content area may include all the corresponding document information. If, however, the user's behavior fails to comply with the behavior policy for a second content area, the content displayed for the second content area may obscure at least a portion of the corresponding information.

In some embodiments, the workflow optimizer 238 may be used to execute one or more workflow automations to optimize the interaction behaviors on behalf of the user. For example, such a workflow automation may update one or more configuration settings of the user device 210 and other electronic devices associated with the user (e.g., the user device 220), which may be in proximity to the user device 210 and/or communicatively coupled or paired to the user device 210 via a wired or wireless connection. The user device 220 in this example may be a head-mounted display device that is determined to have a more secure interface for viewing sensitive information. Accordingly, the GUI 216 of the user device 210 may be used to prompt the user to don the head-mounted display as a condition to view the previously obscured sensitive information (e.g., corresponding to the second content area of the document described above) via the interface of the user device 220. In some implementations, the content displayed for the second content area may include a security message that obscures the sensitive information and suggests the appropriate remedial action (e.g., donning the user device 220) for the user to view the obscured information. The workflow optimizer 238 in this example may perform the necessary automations on behalf of the user to facilitate the transfer and display of the information for the content areas of the document from the user device 210 (and the GUI 216) to the user device 220 (and the display 224). Such automations may also be influenced by user preferences and/or information management policies established by the employer or other entity that owns and/or manages the information in question.

It should be appreciated that the I/O interfaces of the respective user devices 210 and 220 described above may also include any of various output interfaces to provide one or more outputs for the user via corresponding output devices coupled to or integrated with the user device 210 and/or the user device 220, based on the output data 235 received from the server 230. The output(s) may include, for example, an audio output via one or more speakers, a visual output via a display (such as the display 224 of the user device 220), a light output via one or more light sources (e.g., a light ring), a haptic output via one or more haptic or vibration devices (e.g., haptic feedback via a haptic touchpad or a rumble motor), or any combination of the foregoing. For example, the user device 220 may be a peripheral device (such as a VR headset or head-mounted display) paired to the user device 210, as described above. As a peripheral device, the user device 220 may operate as one or both of an input device that receives user input (via corresponding input controls) and an output device that generates an output based on the output data 235 from the server 230. In some implementations, the I/O interfaces of the user device 220 may operate as extended I/O interfaces of the user device 210, where user input received via the GUI 224 (or other input control) of the user device 220 is automatically transferred to a corresponding input interface of the user device 210. The user device 210 may transmit such user input to the server 230 via the network 202. Conversely, the output data 235 received by the user device 210 from the server 230 via the network 202 may be automatically transferred to the user device 220 for display via the GUI 224.

Although the user devices 210 and 220 are illustrated in FIG. 2 as being separate from and external to the server 230, it should be appreciated that, in some implementations, one or more of these devices may be included or integrated within the server 230, for example, as part of an information handling system, such as the information handling system 114 of FIG. 1 described above. Also, while not shown in FIG. 2, it should be appreciated that certain output (e.g., video or audio output) generated in response to the user input may be provided to or experienced by the user via an appropriate output device (e.g., a display device or an audio speaker) that is coupled to or integrated with the server 230. An example configuration of such an integrated information handling system is shown in FIG. 3.

Figure 3:
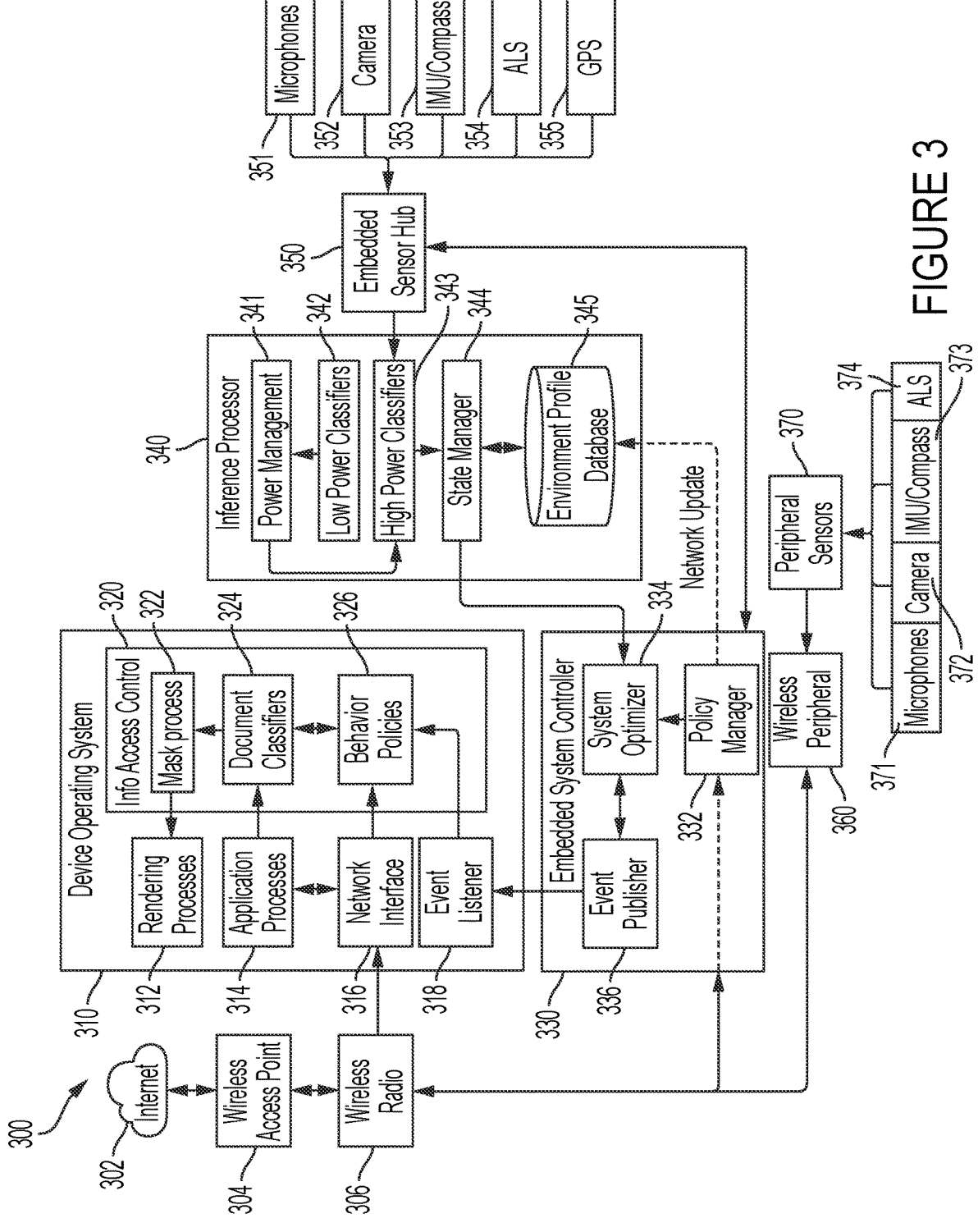
FIG. 3 is a block diagram of an example configuration of an integrated system for providing secure information access control using sensor-based inferences of a user's environment and behavior within the environment according to some embodiments of the present disclosure.

FIG. 3 is a block diagram of an example configuration of an integrated system 300 for providing information access control using sensor-based inferences of a user's environment and behavior within the environment according to some embodiments of the present disclosure. System 300 may be implemented using any computing device or system, such as the information handling system 114 of FIG. 1, as described above. As shown in FIG. 3, the system 300 includes a device operating system 310 in which an information access controller 320 (e.g., the information access controller 236 of FIG. 2) may be implemented. The device operating system 310 may also include one or more rendering processes 312, one or more application processes 314, a network interface 316 (e.g., the network interface 239 of FIG. 2), and an event listener 318.

The device operating system 310 and components thereof (including the information access controller 320) may communicate via a data bus with an embedded system controller 330. The embedded system controller 330 may include a policy manager 332 (e.g., the policy manager 234 of FIG. 2), a system optimizer 334 (e.g., the workflow optimizer 238 of FIG. 2), and an event publisher 336. The embedded system controller 330 may communicate via one or more data busses with an inference processor 340 (e.g., the inference processor 232 of FIG. 2) and an embedded sensor hub 350. The inference processor 340 may include a power management unit 341, one or more low power classifiers 342, one or more high power classifiers 343, a state manager 344, and an environment profile database 345 (e.g., the DB 240 of FIG. 2). The embedded system controller 330 may also communicate via a wireless radio 306 with a wireless peripheral 360 (e.g., a head-mounted display) having various peripheral sensors 370. The wireless radio 306 may also be used to couple the network interface 316 of the device operating system 310 to a wireless access point 304 for purposes of communicating with other electronic devices and systems (not shown) via a network 302 (e.g., the Internet).

While the information access controller 320, the embedded system controller 330, and the inference processor 340 are shown as separate components of the system 300 in FIG. 3, it should be appreciated that embodiments are not intended to be limited to this configuration and that these components may be implemented using any of various configurations as desired for a particular implementation. For example, these components may implemented together as part of the device operating system 310 or as part of an information access control subsystem that is separate from the device operating system 310 of the system 300. In some implementations, the information access controller 320 of the device operating system 310, the embedded system controller 330 (including the policy manager 332 and the system optimizer 334), and the inference processor 340 may work together to perform various operations of an information access control service for providing secure information access control using sensor-based inferences of a user's environment and behavior within the environment, as described above.

In some embodiments, the inference processor 340 may be capable of operating in different power states corresponding to different operational modes of the system 300, such as a low-power state (corresponding to an inactive or standby mode of operation) and one or more higher-powered states (corresponding to one or more active modes of operation). For example, the inference processor 340 may use sensor-based inferences of the user's environment and behavior within the environment to determine when to transition between these power states and modes of operation. The inference processor 340 may receive data from one or more embedded sensors of the system 300 via the embedded sensor hub 350. Such sensors may include, for example and without limitation, one or more microphones 351, a digital camera 352, an IMU or compass 353, an ambient light sensor (ALS) 354, and a GPS 355. In some implementations, the inference processor 340 may also receive data from one or more of the peripheral sensors 370 of the wireless peripheral 360 coupled to the system 300 via the wireless radio 306 and the network interface 316. The peripheral sensors 370 may include, for example and without limitation, one or more microphones 371, a digital camera 372, an IMU or compass 373, and an ALS 374.

In some embodiments, the inference processor 340 may perform parallel statistical analysis on each sensor data stream that is received to infer a current behavior pattern of the user (or current sample of the user's behavior) within an environment. The current behavior sample may be compared with a previous sample of the user's behavior to determine whether the user's behavior and/or environment has changed. For example, the inference processor 340 may determine that the user's current location has changed or deviated from the user's last known location by several hundred feet (e.g., by more than 400 feet) based on the analysis of data received from the GPS 355 and/or the IMU/compass 353 over a predetermined interval. The inference processor 340 may also infer from the analysis of audio data received from the microphone(s) 351 that the ambient noise level of the environment has increased significantly over the same interval. If the inference processor 340 in this example determines that the current behavior sample (e.g., the user's location and/or audio noise level) exceeds the previous sample by more than a threshold amount (e.g., based on a statistical threshold for each type of sensor data), the inference processor 340 may determine that the user's behavior and/or environment has changed. Accordingly, the inference processor 340 may direct the power management unit 341 to shift from a low-power operational state that uses the low power classifiers 342 into a higher-powered operational state using the high power classifiers 343. In some implementations, the low power classifiers 342 and the high power classifiers 343 may correspond to different sets of classification models with varying computational capabilities. For example, the high power classifiers 343 may correspond to a set of joint and discrete statistical models, including semantic classifiers, which enable a higher class of computational capabilities for the inference processor 340.

In some embodiments, the inference processor 340 may also use the state manager 344 to publish a behavior update event for the information access controller 320. For example, the state manager 344 may send a notification regarding the behavior update to the embedded system controller 330, and the event publisher 336 of the embedded system controller 330 may publish the behavior update event for the event listener 318 of the device operating system 310. In some implementations, the update event published by the event publisher 336 may include inference data, such as a series of class labels, output by the high power classifiers 343 for the environment (and received by the embedded system controller 330 along with the notification from the state manager 344). The inference data may correspond to, for example, various attributes of the environment that were inferred based on the analysis of the sensor data performed by the inference processor 340 (or classifiers thereof).

In some embodiments, the information access controller 320 may use the inferred attributes of the environment to determine a corresponding environment profile for which the known attributes match the inferred attributes, as described above. For example, the environment profile may be one of a plurality of environment profiles stored in the environment profile database 345. The environment profile may specify one or more behavior policies 326 for a user of the system 300 to access or view different classes of information. For example, the user may request access to a document via at least one of the application processes 314. The document may include one or more content areas and each content area may correspond to a different class of information with a different behavior policy specified by the environment profile for accessing the information in that class. In some embodiments, the information access controller 320 may use one or more document classifiers 324 to analyze the content of the requested document and identify different classes of content along with their respective locations within the document. For example, the information access controller 320 may generate a set of document class labels that identifies the appropriate behavior policy specified by the environment profile for each region or content area of the document. The behavior policy for each content area of the document may then be compared with the inferred behavior pattern of the user to determine whether the user's behavior complies with the behavior policy and is therefore authorized to view the corresponding document information for that content area. If the user's behavior does not comply with the behavior policy of a particular content area of the document, a masking process 322 of the information access controller 320 may be used to obscure the corresponding document information before it is rendered to a display by the one or more rendering processes 312. The one or more rendering processes 312 may include any of various processes for rendering content (such as information corresponding to one or more content areas of a document requested by a user of the system 300) via a GUI or display of the system 300. The masking process 322 may use any of various visualization techniques to obscure the information associated with the content area, such as by overlaying a security message that hides the information, blurring the information, filling the area with a color or pattern, or any other technique that renders the information illegible or invisible.

In some embodiments, the masking process 322 may be used to provide the user with a secure view of the document via a user interface of the system 300 (e.g., via a GUI of the application process in which the user requested the document). The secure view may include, for. example, a version of the document with appropriate content displayed for the information corresponding to each content area based on user's compliance with the behavior policy. For example, if the behavior pattern of the user complies with the behavior policy associated with a first content area of the document, the content displayed for the first content area may include all the corresponding document information. If, however, the user fails to comply with a behavior policy associated with a second content area of the document, the content displayed for the second content area may obscure at least a portion of the corresponding information. The content for the second content area may include, for example, a security message that suggests a remedial action for the user to view all the corresponding information. If the user performs the suggested remedial action, the second content area may be updated to include the portion of the corresponding information that was previously obscured. In some embodiments, the remedial action may require the user to view the document using a second, more secure device (e.g., a head-mounted display), in which case the document including the updated content for the second content area may be provided to the second device for the user to view.

FIGS. 4 and 5 are flow diagrams that further illustrate the above-described operations of the system 300 and its various components, including the information access controller 320, the embedded system controller 330, and the inference processor 340, for providing secure information access control using sensor-based inferences of a user's environment and behavior within the environment according to some embodiments of the present disclosure.

FIG. 4 is a flow diagram of an example method 400 for determining sensor-based inferences of a user's (and user device's) environment and behavior according to some embodiments of the present disclosure. The user's device (e.g., the system 300 of FIG. 3) and inference processor (e.g., the inference processor 340 of FIG. 3) thereof may be capable of operating in different power states corresponding to different modes of operation, such as a low-power state (corresponding to an inactive or standby mode of operation) and one or more higher-powered states (corresponding to one or more active modes of operation), as described above. Also, as described above, sensor-based inferences of the user's environment and behavior patterns within the environment may be used to transition the device and its components (e.g., the inference processor 340 of FIG. 3) between these power states and modes of operation. For example, the device may initially be in a low-power or inactive state at the start of the method 400 and transition into a higher powered operational state to enable a higher class of computational capabilities.

As shown in FIG. 4, the remainder of the method 400 may correspond to various operations of the inference processor and embedded system controller (e.g., the embedded system controller 330 of FIG. 3) for publishing a behavior update event to the device operating system, as described above. The method 400 may also include displaying a summary of the inferred behavior pattern and environment profile (e.g., as a "behavior profile") via a user interface of the device, which the user may manually change via the user interface to further improve future statistical modeling.

FIG. 5 is a flow diagram of an example method 500 for applying sensor-based inferences of a user's behavior within an environment to provide content-based information access control according to some embodiments of the present disclosure. The method 500 may correspond to the operations of the information access controller 320 of FIG. 3, as described above, for providing a secure view of different content areas of a document requested by the user based on the user's compliance with a behavior policy associated with each content area. For example, if the user fails to comply with a behavior policy associated with a particular content area of the document, the content displayed in that content area (e.g., an in-context overlay or a security message) may obscure at least a portion of the corresponding information until the user performs a remedial action that updates the view and allows the previously obscured information to become visible.

FIG. 6 is a flow diagram of an example method 600 for providing secure information access control using sensor-based inferences of a user's environment and behavior within the environment according to some embodiments of the present disclosure. Method 600 may be performed by an information handling system, such as the server 230 of FIG. 2 or the system 300 of FIG. 3, as described above.

Method 600 begins at block 602, which includes receiving, by the information handling system, data from one or more sensors of a first device operated by a user within an environment. In some implementations, the first device may be integrated with the information handling system, as described above with respect to system 300 of FIG. 3. Accordingly, the sensor(s) may include embedded sensors of the system and/or peripheral sensors of a peripheral device (e.g., the wireless peripheral 360 of FIG. 3) communicatively coupled to the system.

At block 604, a behavior pattern of the user within the environment is determined based on the data received from the sensors at block 602. The method 600 then proceeds to block 606, which includes comparing the behavior pattern of the user with a behavior policy that controls access to information corresponding to each of one or more content areas of a document requested by the user within the environment.

At block 608, a secure view of the document with content displayed for the information corresponding to each of the one or more content areas of the document is provided via a user interface of the first device, based on the comparison.

Figure 7:
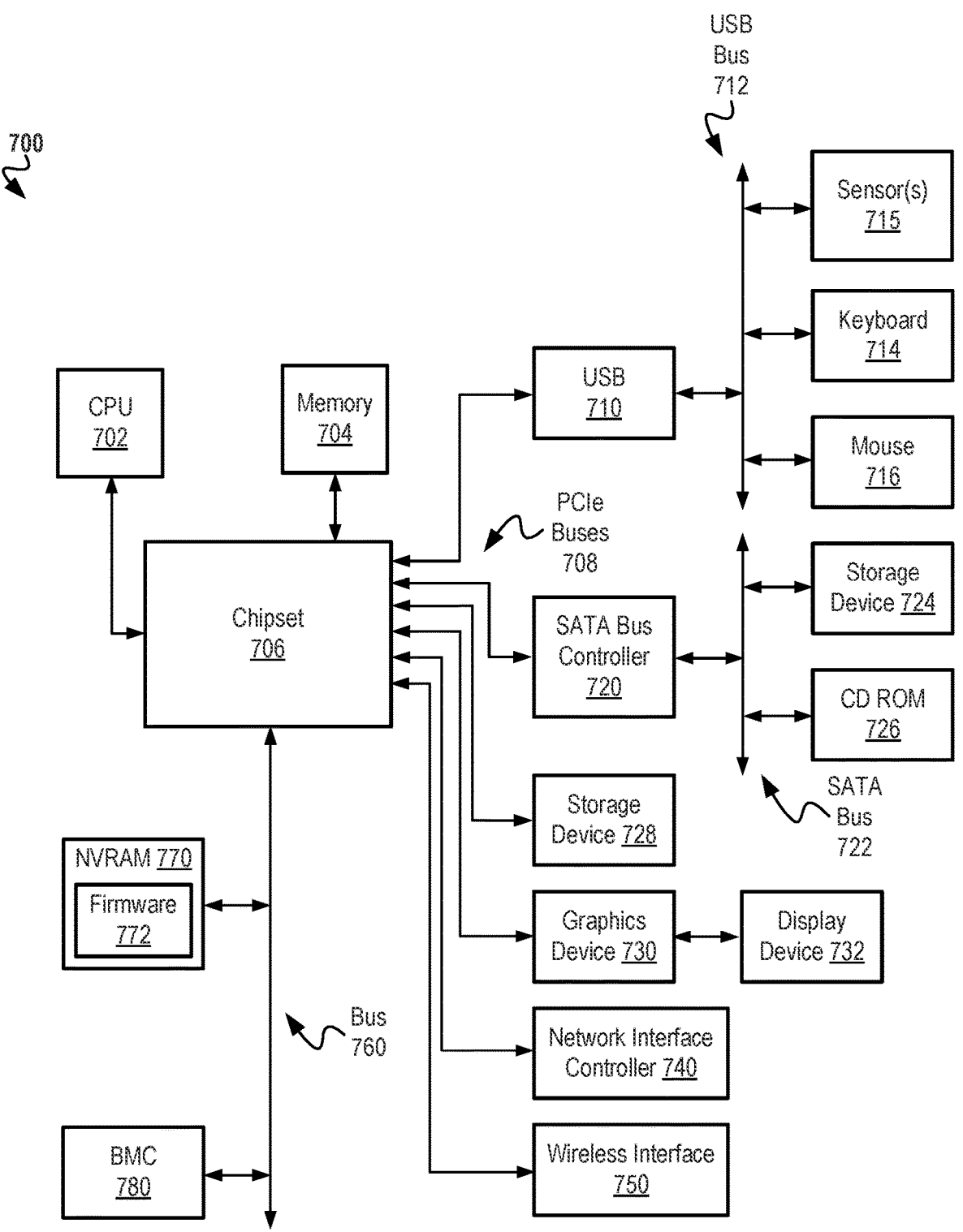
FIG. 7 is a schematic block diagram of an example information handling system in which embodiments of the present disclosure may be implemented.

FIG. 7 illustrates an example information handling system 700 in which embodiments of the present disclosure may be implemented. Information handling system 700 may include a processor 702 (e.g., a central processing unit (CPU)), a memory (e.g., a dynamic random-access memory (DRAM)) 704, and a chipset 706. In some embodiments, one or more of the processor 702, the memory 704, and the chipset 706 may be included on a motherboard (also referred to as a mainboard), which is a printed circuit board (PCB) with embedded conductors organized as transmission lines between the processor 702, the memory 704, the chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 702, the memory 704, the chipset 706, and/or other components may be organized as a System on Chip (SoC).

The processor 702 may execute program code by accessing instructions loaded into memory 704 from a storage device, executing the instructions to operate on data also loaded into memory 704 from a storage device, and generate output data that is stored back into memory 704 or sent to another component. The processor 702 may include processing cores capable of implementing any of a variety of instruction set architectures (ISAs), such as the x86, POW-ERPC®, ARM®, SPARC®, or MIPS® ISAs, or any other suitable ISA. In multi-processor systems, each of the processors 702 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 706 may facilitate the transfer of data between the processor 702, the memory 704, and other components. In some embodiments, chipset 706 may include two or more integrated circuits (ICs), such as a northbridge controller coupled to the processor 702, the memory 704, and a southbridge controller, with the southbridge controller coupled to the other components such as USB 710, SATA 720, and PCIe buses 708. The chipset 706 may couple to other components through one or more PCIe buses 708.

Some components may be coupled to one bus line of the PCIe buses 708, whereas some components may be coupled to more than one bus line of the PCIe buses 708. One example component is a universal serial bus (USB) controller 710, which interfaces the chipset 706 to a USB bus 712. A USB bus 712 may couple input/output components such as a keyboard 714 and a mouse 716, but also other components such as USB flash drives, or another information handling system. Another example component is a SATA bus controller 720, which couples the chipset 706 to a SATA bus 722. The SATA bus 722 may facilitate efficient transfer of data between the chipset 706 and components coupled to the chipset 706 and a storage device 724 (e.g., a hard disk drive (HDD) or solid-state disk drive (SDD)) and/or a compact disc read-only memory (CD-ROM) 726. The PCIe bus 708 may also couple the chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 706 may also be coupled to a serial peripheral interface (SPI) and/or Inter-Integrated Circuit (I2C) bus 760, which couples the chipset 706 to system management components. For example, a non-volatile random-access memory (NVRAM) 770 for storing firmware 772 may be coupled to the bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

System 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of system 700.

Firmware 772 may include instructions executable by processor 102 to initialize and test the hardware components of system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of system 700 may be configured and enabled for operation and device drivers may be installed. Device drivers may provide an interface through which other components of the system 700 can communicate with a corresponding device. The firmware 772 may include a basic input-output system (BIOS) and/or include a unified extensible firmware interface (UEFI). Firmware 772 may also include one or more firmware modules of the information handling system. Additionally, configuration settings for the firmware 772 and firmware of the information handling system 700 may be stored in the NVRAM 770. NVRAM 770 may, for example, be a non-volatile firmware memory of the information handling system 700 and may store a firmware memory map namespace 700 of the information handling system. NVRAM 770 may further store one or more container-specific firmware memory map namespaces for one or more containers concurrently executed by the information handling system.

Information handling system 700 may include additional components and additional busses, not shown for clarity. For example, system 700 may include multiple processor cores (either within processor 702 or separately coupled to the chipset 706 or through the PCIe buses 708), audio devices (such as may be coupled to the chipset 706 through one of the PCIe busses 708), or the like. While a particular arrangement of bus technologies and interconnections is illustrated for the purpose of example, one of skill will appreciate that the techniques disclosed herein are applicable to other system architectures. System 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, the information handling system 700 may include a server comprising multiple processors for parallel processing. In some embodiments, the information handling system 700 may support virtual machine (VM) operation, with multiple virtualized instances of one or more operating systems executed in parallel by the information handling system 700. For example, resources, such as processors or processing cores of the information handling system may be assigned to multiple containerized instances of one or more operating systems of the information handling system 700 executed in parallel. A container may, for example, be a virtual machine executed by the information handling system 700 for execution of an instance of an operating system by the information handling system 700. Thus, for example, multiple users may remotely connect to the information handling system 700, such as in a cloud computing configuration, to utilize resources of the information handling system 700, such as memory, processors, and other hardware, firmware, and software capabilities of the information handling system 700. Parallel execution of multiple containers by the information handling system 700 may allow the information handling system 700 to execute tasks for multiple users in parallel secure virtual environments.

Each of the schematic flow diagrams of FIGS. 4, 5, and 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received telemetry data, and a system or inference processor thereof and/or a degree to which such an influencing attribute affects the outcome of such a system or inference processor.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Further, a device or system that is configured in a certain way is configured in at least that way, but it can also be configured in other ways than those specifically described. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
receiving, by an information handling system, data from one or more sensors of a first device operated by a user within an environment;
determining a behavior pattern of the user based on the data that identifies the environment;
determining a behavior policy based on the behavior pattern, wherein the behavior policy controls access to information corresponding to at least one or more content areas of a document requested by the user while in the environment; and
providing, via a user interface of the first device and based on the behavior policy, a secure view of the document with content displayed for the information corresponding to the at least one or more content areas of the document,
wherein the behavior pattern of the user complies with the behavior policy associated with a first content area of the at least one or more content areas of the document, wherein the behavior pattern of the user does not comply with the behavior policy associated with a second content area of the at least one of more content areas of the document,
wherein the content displayed for the first content area includes all corresponding information, and wherein the content displayed for the second content area obscures at least a portion of the corresponding information.

2. The method of claim 1, wherein the one or more sensors include a microphone, a digital camera, and one or more location sensors of the first device, and wherein the one or more location sensors include one or more of a global positioning satellite (GPS) receiver, an accelerometer, a gyroscope, a magnetometer, and an inertial measurement unit (IMU).

3. The method of claim 1, further comprising:
analyzing the data to infer attributes of the environment;
determining an environment profile for the environment, based on the inferred attributes, the environment profile specifying the behavior policy associated with each content area of the document; and
determining whether the behavior pattern of the user complies with the behavior policy specified by the environment profile for each content area, wherein the secure view of the document is provided with the content for each content area based on the determination.

4. The method of claim 3, wherein analyzing the data comprises applying the data to one or more statistical models to infer the attributes of the environment.

5. The method of claim 3, wherein determining the environment profile comprises:
comparing the inferred attributes of the environment with known attributes associated with each environment profile of a plurality of environment profiles stored in a database; and
identifying, from among the plurality of environment profiles, the environment profile for which the known attributes match the inferred attributes of the environment, based on the comparing.

6. The method of claim 1, wherein the content displayed in the second content area includes a security message that suggests a remedial action for the user to view all the corresponding information, and wherein the content displayed in the second content area is updated in response to the user performing the remedial action to include the portion of the corresponding information that was previously obscured.

7. The method of claim 6, wherein the remedial action requires the user to view the document using a second device, and wherein the document including the updated content for the second content area is provided to the second device for the user to view via a display of the second device.

8. The method of claim 7, wherein the second device is a head-mounted display communicatively coupled to the first device.

9. The method of claim 1, wherein the document requested by the user is processed using one or more classification models to determine the information corresponding to each of the one or more content areas and a location of each of the one or more areas within the document.

10. An information handling system, comprising:
a memory;
a processor coupled to the memory, wherein the processor is configured to perform steps comprising:
receiving, by an information handling system, data from one or more sensors of a first device operated by a user within an environment;
determining a behavior pattern of the user based on the data that identifies the environment;
determining a behavior policy based on the behavior pattern, wherein the behavior policy controls access to information corresponding to at least one or more content areas of a document requested by the user while in the environment; and providing, via a user interface of the first device and based on the behavior policy, a secure view of the document with content displayed for the information corresponding to the at least one or more content areas of the document, wherein the behavior pattern of the user complies with the behavior policy associated with a first content area of the at least one or more content areas of the document, wherein the behavior pattern of the user does not comply with the behavior policy associated with a second content area of the at least one of more content areas of the document, wherein the content displayed for the first content area includes all corresponding information, and wherein the content displayed for the second content area obscures at least a portion of the corresponding information.

11. The information handling system of claim 10, wherein the processor is configured to perform further steps further comprising:

analyzing the data to infer attributes of the environment;

determining an environment profile for the environment, based on the inferred attributes, the environment profile specifying the behavior policy associated with each content area of the document; and determining whether the behavior pattern of the user complies with the behavior policy specified by the environment profile for each content area, wherein the secure view of the document is provided with the content for each content area based on the determination.

12. The information handling system of claim 11, wherein analyzing the data comprises applying the data to one or more statistical models to infer the attributes of the environment.

13. The information handling system of claim 11, wherein determining the environment profile comprises:

comparing the inferred attributes of the environment with known attributes associated with each environment profile of a plurality of environment profiles stored in a database; and identifying, from among the plurality of environment profiles, the environment profile for which the known attributes match the inferred attributes of the environment, based on the comparing.

14. The information handling system of claim 10, wherein the content displayed in the second content area includes a security message that suggests a remedial action for the user to view all the corresponding information, and wherein the content displayed in the second content area is updated in response to the user performing the remedial action to include the portion of the corresponding information that was previously obscured.

15. The information handling system of claim 10, wherein the document requested by the user is processed using one or more classification models to determine the information corresponding to each of the one or more content areas and a location of each of the one or more areas within the document.

16. A computer program product, comprising:

a non-transitory computer readable medium comprising code for performing steps comprising:

receiving, by an information handling system, data from one or more sensors of a first device operated by a user within an environment;

determining a behavior pattern of the user based on the data that identifies the environment;

determining a behavior policy based on the behavior pattern, wherein the behavior policy controls access to information corresponding to at least one or more content areas of a document requested by the user while in the environment; and providing, via a user interface of the first device and based on the behavior policy, a secure view of the document with content displayed for the information corresponding to the at least one or more content areas of the document, wherein the behavior pattern of the user complies with the behavior policy associated with a first content area of the at least one or more content areas of the document, wherein the behavior pattern of the user does not comply with the behavior policy associated with a second content area of the at least one of more content areas of the document, wherein the content displayed for the first content area includes all corresponding information, and wherein the content displayed for the second content area obscures at least a portion of the corresponding information.

17. The computer program product of claim 16, wherein the steps further comprise:

analyzing the data to infer attributes of the environment;

determining an environment profile for the environment, based on the inferred attributes, the environment profile specifying the behavior policy associated with each content area of the document; and determining whether the behavior pattern of the user complies with the behavior policy specified by the environment profile for each content area, wherein the secure view of the document is provided with the content for each content area based on the determination.

18. The computer program product of claim 16, wherein analyzing the data comprises applying the data to one or more statistical models to infer the attributes of the environment.

* * * * *